(12) United States Patent
Monros

(10) Patent No.: US 10,215,149 B2
(45) Date of Patent: Feb. 26, 2019

(54) PLASMA HEADER GASKET AND SYSTEM

(71) Applicant: Serge V. Monros, Santa Ana, CA (US)

(72) Inventor: Serge V. Monros, Santa Ana, CA (US)

( * ) Notice: Subject to any disclaimer, the term of this patent is extended or adjusted under 35 U.S.C. 154(b) by 305 days.

(21) Appl. No.: 13/858,733

(22) Filed: Apr. 8, 2013

(65) Prior Publication Data

US 2014/0299086 A1 Oct. 9, 2014

(51) Int. Cl.
| | |
|---|---|
| *F02B 1/12* | (2006.01) |
| *F02P 13/00* | (2006.01) |
| *F16J 15/06* | (2006.01) |
| *F02P 23/00* | (2006.01) |
| *F02B 77/08* | (2006.01) |
| *F02P 9/00* | (2006.01) |

(52) U.S. Cl.
CPC ............ *F02P 13/00* (2013.01); *F02B 77/085* (2013.01); *F02P 23/00* (2013.01); *F16J 15/064* (2013.01); *F02P 9/007* (2013.01)

(58) Field of Classification Search
CPC . F02P 13/00; F02P 23/00; F02P 9/007; H01T 13/40; H01T 13/46; F02B 1/12
USPC .......................................... 123/143 R, 143 B
See application file for complete search history.

(56) References Cited

U.S. PATENT DOCUMENTS

| | | | |
|---|---|---|---|
| 2,775,234 A | 12/1956 | Smits | |
| 4,436,068 A | 3/1984 | Nakamura et al. | |
| 4,947,680 A | 8/1990 | McDougal | |
| 5,046,466 A * | 9/1991 | Lipski | 123/310 |
| 5,074,262 A | 12/1991 | McAbee et al. | |
| 5,380,014 A | 1/1995 | Schaperkotter | |
| 5,659,132 A * | 8/1997 | Novak et al. | 73/114.16 |
| 6,161,520 A * | 12/2000 | Clarke | 123/310 |
| 6,435,153 B1 | 8/2002 | McAliece et al. | |
| 6,807,933 B2 | 10/2004 | Lipski | |
| 7,299,785 B1 * | 11/2007 | Lee | 123/310 |
| 7,441,540 B1 | 10/2008 | Minami | |
| 7,448,356 B1 | 11/2008 | Minami | |
| 7,661,402 B2 | 2/2010 | Minami | |
| 8,602,005 B2 * | 12/2013 | Ikeda | 123/536 |
| 2006/0096362 A1 | 5/2006 | Vialard | |
| 2010/0180873 A1 | 7/2010 | Kobayashi | |
| 2010/0319656 A1 | 12/2010 | Clarke | |
| 2011/0001294 A1 | 1/2011 | Ikeda | |

OTHER PUBLICATIONS

European Search Report for the European Application No. 13881642.6 dated Nov. 29, 2016.

\* cited by examiner

*Primary Examiner* — Lindsay Low
*Assistant Examiner* — Ruben Picon-Feliciano
(74) *Attorney, Agent, or Firm* — Kelly & Kelley, LLP

(57) ABSTRACT

A plasma header gasket for use with an internal combustion engine includes electrodes disposed around the perimeter of apertures in the gasket corresponding to piston cylinders in the engine. The electrodes produce a plasma spark in time with the engine to increase the efficiency of combustion. The plasma spark produces an ignition discharge compatible with various types of engines and types of fuels.

10 Claims, 5 Drawing Sheets

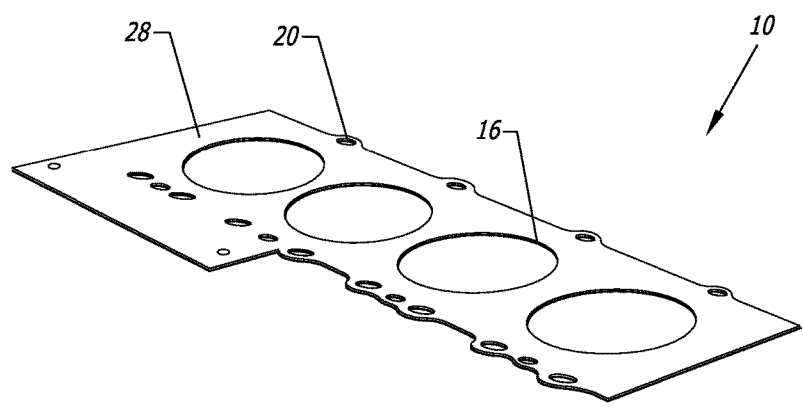
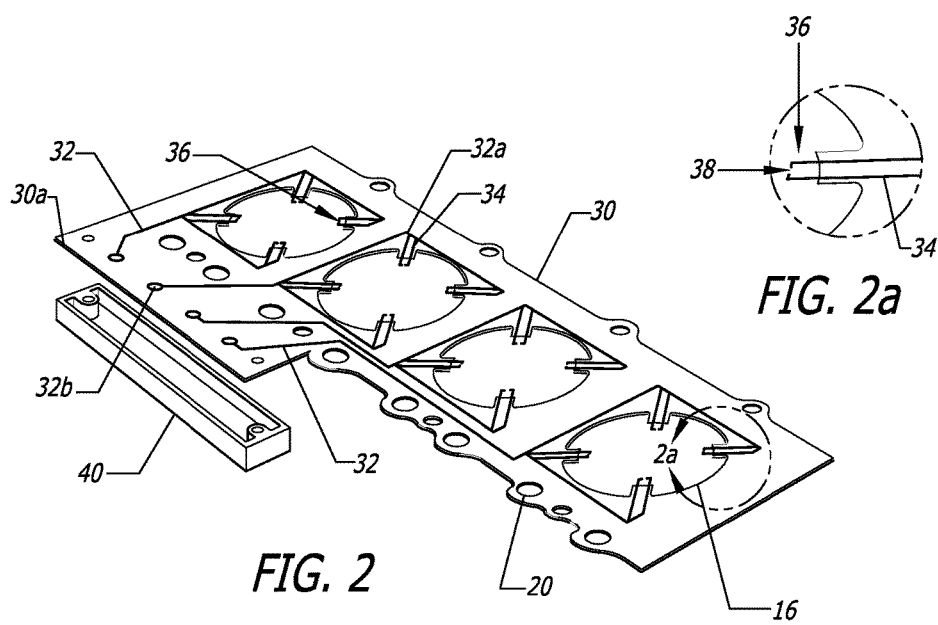
FIG. 2
FIG. 2a

PLASMA HEADER GASKET AND SYSTEM

BACKGROUND OF THE INVENTION

The present invention generally relates to a gasket for use between an engine block and engine header. The gasket includes electrodes disposed in the openings corresponding to piston cylinders. The electrodes spark in time with the other ignition parameters, i.e., spark plug or compression, to increase the efficiency of the combustion.

The basic operation of standard internal combustion (IC) engines varies somewhat based on the type of fuel or combustion process, the quantity of cylinders and the desired use/functionality. Certain types of fuel, such as gasoline, require a spark as from a spark plug to initiate combustion. Other types of fuel, such as diesel, require merely compression to raise the temperature of the air, which results in spontaneous combustion of the diesel when introduced. Diesel engines include glow-plugs to add heat and initiate combustion in a cold diesel engine. Engines may also be designed to use alternative fuels, such as biodiesel, liquid natural gas, liquefied petroleum gas, compressed natural gas and ethanol, to name a few. Combustion of all of these types of fuel usually leaves some residual, uncombusted fuel and other components after combustion.

In a traditional two-stroke engine, oil is pre-mixed with fuel and air before entry into the crankcase. The oil/fuel/air mixture is drawn into the crankcase by a vacuum created by the piston during intake. The oil/fuel mixture provides lubrication for the cylinder walls, crankshaft and connecting rod bearings in the crankcase. The fuel is then compressed and ignited by a spark plug that causes the fuel to burn. The piston is then pushed downwardly and the exhaust fumes are allowed to exit the cylinder when the piston exposes the exhaust port. The movement of the piston pressurizes the remaining oil/fuel in the crankcase and allows additional fresh oil/fuel/air to rush into the cylinder, thereby simultaneously pushing the remaining exhaust out the exhaust port. Momentum drives the piston back into the compression stroke as the process repeats itself. In a four-stroke engine, oil lubrication of the crankshaft and connecting rod bearings is separate from the fuel/air mixture. Here, the crankcase is filled mainly with air and oil. It is the intake manifold that receives and mixes fuel and air from separate sources. The fuel/air mixture in the intake manifold is drawn into the combustion chamber where it is ignited by the spark plugs and burned. Both types of engines employ a spark to combust the fuel and both leave residual, uncombusted fuel and other components in the combustion chamber.

Thus, there exists a significant need for an improved ignition system to increase the efficiency of combustion in most types of engines burning most types of fuels. Such an ignition system would ideally work in tandem with existing prior art ignition systems for retrofit designs, as well as, be available for original equipment manufacturers as a stand-alone system. The improved ignition system should include a plasma header gasket disposable between the engine and header blocks of an internal combustion engine, and having igniters presenting electrodes disposed in the piston cylinder apertures of the gasket. A microprocessor control unit and plasma amplifier augment the spark typically generated by a prior art ignition system to produce a plasma spark—the plasma spark producing over 200 Amps per discharge. The present invention fulfills these needs and provides further related advantages.

SUMMARY OF THE INVENTION

The present invention is directed to a plasma header gasket configured for placement between an engine block and a header block of an internal combustion engine, similar to a prior art header gasket. The plasma header gasket comprises a laminated substrate having an aperture corresponding to a piston cylinder in an engine block of an internal combustion engine, similar to a prior art header gasket. A pair of conductors are associated with the substrate and are electrically connected to an igniter. The igniter comprises a pair of exposed electrodes defining an electrode gap that is disposed in the aperture. Different types of conductive coatings may be applied to the electrodes, such as platinum, stainless steel, other noble metals, and alloys thereof.

The substrate comprises dielectric layers with the pair of conductors being electrically conductive circuit traces disposed between the dielectric layers. A connection block is preferably disposed on the substrate and electrically connected to the pair of conductors. The circuit traces electrically connect the igniter to the connection block. The plasma header gasket also includes a temperature sensor associated with the aperture and electrically connected to the connection block by a secondary conductor associated with the substrate.

The plasma header gasket may comprise a plurality of pairs of conductors associated with the substrate and electrically connected to the connection block. The plasma header gasket may also comprise a plurality of igniters, each electrically connected to one of the plurality of pairs of conductors. Each of the plurality of igniters comprises a pair of exposed electrodes defining an electrode gap disposed in the aperture.

The laminated substrate may have a plurality of apertures with each aperture corresponding to one of a plurality of piston cylinders in the engine block. With a plurality of apertures and a plurality of igniters, each of the plurality of igniters comprises a pair of exposed electrodes defining an electrode gap disposed in one of the plurality of apertures. In such case, each of the plurality of igniters is conjointly electrically connected to a respective one of the plurality of pairs of conductors.

A plasma header gasket system of the present invention may comprise a plasma header gasket as described above and further include a microprocessor control unit electrically connected to the connection block. The microprocessor control unit is programmed to spark the igniter in time with a piston in the piston cylinder. A plasma amplifier is electrically connected to the igniter and controllable by the microprocessor control unit. The plasma amplifier produces a plasma spark through the igniter when the microprocessor control unit sparks the igniter. The microprocessor control unit may be programmed to spark the plurality of igniters sequentially around a particular aperture so as to create a combustion vortex in the corresponding piston cylinder.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 2 is an exploded perspective view of the plasma header gasket of the present invention;

FIG. 2a is a close-up view of FIG. 2 designated by the circle 2a;

FIG. 3a is a close-up view of FIG. 3 in the area designated by circle 3a;

DETAILED DESCRIPTION OF THE PREFERRED EMBODIMENTS

Figure 1:
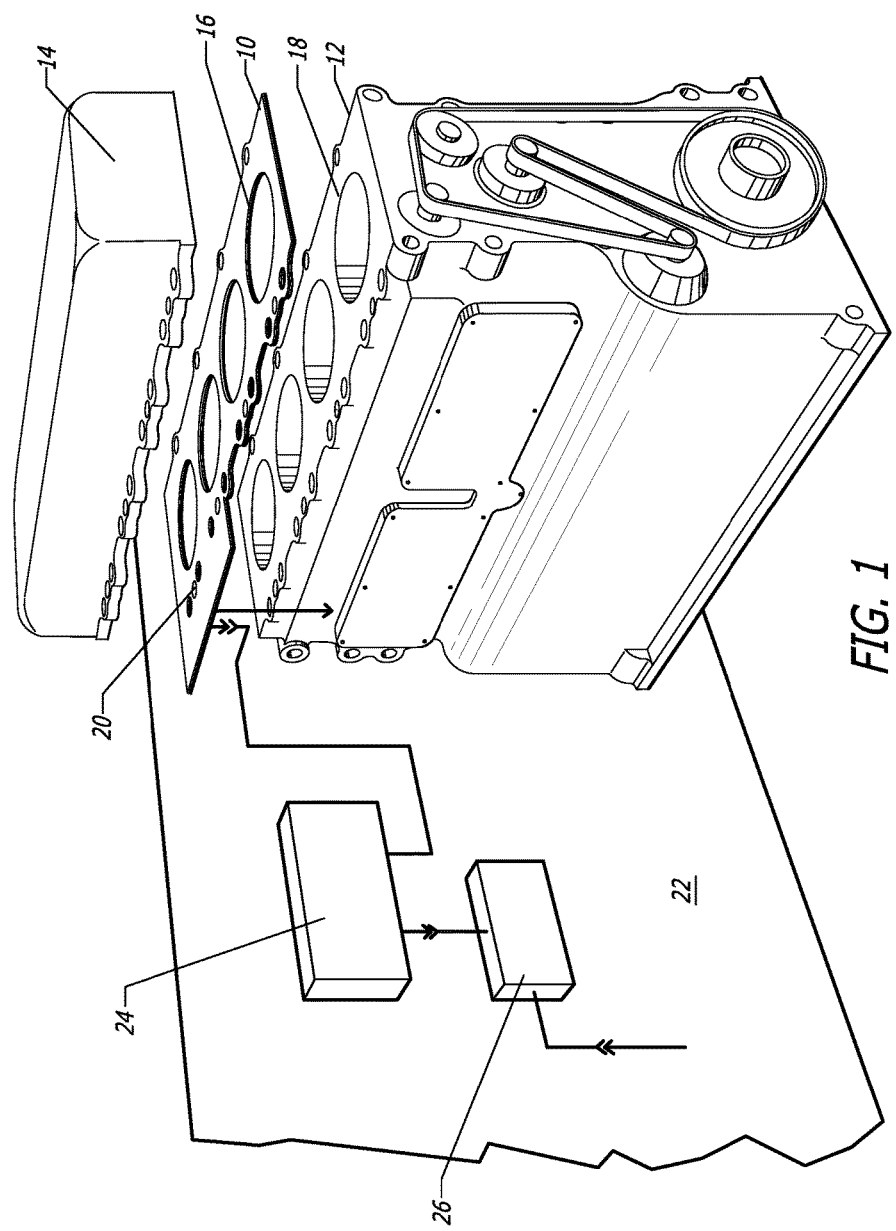
FIG. 1 is an environmental, exploded perspective view of an internal combustion engine incorporating the inventive plasma header gasket.

As shown in the drawings for purposes of illustration, the present invention for a plasma header gasket is referred to generally by the reference number 10. In FIG. 1, the plasma header gasket 10 is illustrated as being disposed between an engine block 12 and engine header 14. The plasma header gasket 10 may include four apertures 16 that correspond to four piston cylinders 18 in the engine block 12. Although not depicted, there are corresponding header cylinders in the engine header 14, as is understood by those skilled in the art. The plasma header gasket 10 also includes a plurality of bolt openings 20 to accommodate connectors (not shown) that secure the engine header 14 to the engine block 12.

FIG. 1 also illustrates a firewall 22 as exists between an engine compartment and a passenger compartment on a vehicle. A microprocessor control unit 24 is preferably mounted on the firewall 22 and electrically connected to the plasma header gasket 10. An ignition coil 26 is also included in the engine compartment and is electrically connected to the microprocessor control unit 24. The interconnection of these components will be described in more detail below.

The engine depicted in FIG. 1 is intended to depict a typical diesel engine. However, the plasma header gasket 10 of the present invention may be compatible with other types of internal combustion engines, whether two-stroke or four-stroke engines, or burning alternate fuels, i.e., gasoline, diesel, biodiesel, liquid natural gas, liquefied petroleum gas, compressed natural gas, or ethanol, to name a few.

FIG. 2 illustrates an exploded view of the plasma header gasket 10 of the present invention. The plasma header gasket 10 is a laminated structure comprising at least an upper laminate 28 and a lower laminate 30. Pairs of conductors 32 are disposed on either the upper laminate 28 or the lower laminate 30. These pairs of conductors 32 are configured to provide positive and negative electrical communication paths as are found in typical electrical connections. One end 32a of the pairs of conductors 32 is connected to an igniter 34 disposed in an aperture 16. As shown in the close-up of FIG. 2a, the igniter 34 has a pair of exposed electrodes 36 that extend into the aperture 16 from the perimeter and define an electrode gap 38 in the aperture 16. The other end 32b of the pair of conductors 32 extend to an edge portion 30a of the laminate 30 where they are coupled to a connection block 40. The connection block 40 facilitates connection of the plasma header gasket 10 to other components of the plasma header gasket system described more fully below.

Figure 3:
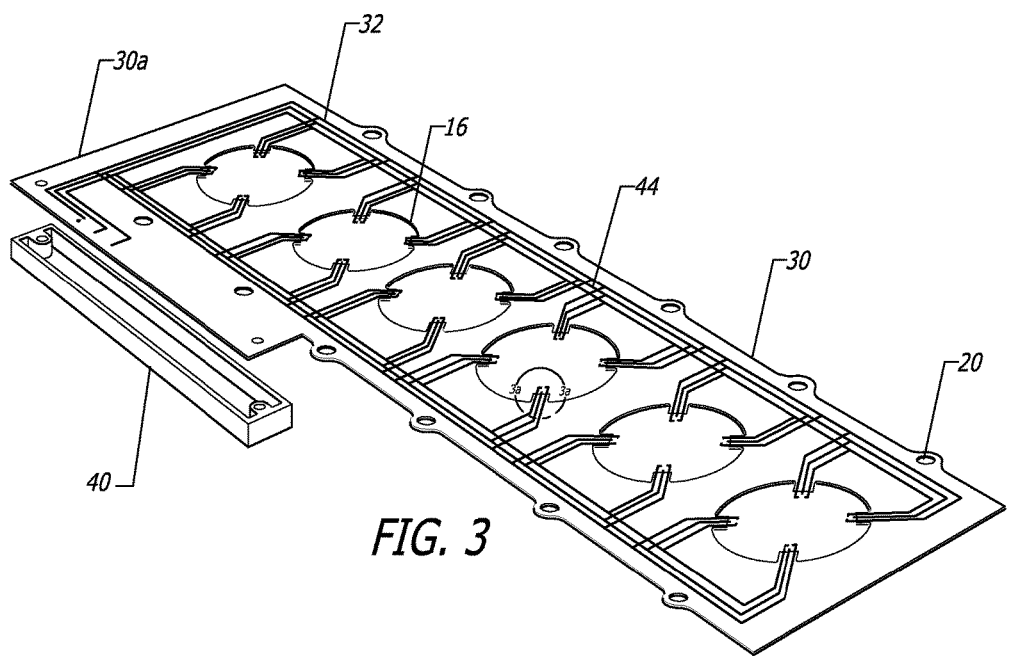
FIG. 3 is a perspective view of one of the laminates with circuit traces of the plasma header gasket of the present invention.

FIG. 3 illustrates an alternate embodiment of the lower laminate 30 of the plasma header gasket 10. In this embodiment, the plasma header gasket contains six apertures 16. In the earlier embodiment, the plasma header gasket 10 included four apertures 16. A person skilled in the art will appreciate that the plasma header gasket 10 may be configured with any number of apertures 16 as there may exist piston cylinders 18 in an engine block 12. Thus, a plasma header gasket 10 may be created that has one, two, three, four, six, eight or any number of apertures 16.

One will also observe that each aperture 16 in the plasma header gasket 10 is illustrated with four igniters 34 in each aperture 16. A person skilled in the art will appreciate that the number of igniters 34 associated with any single aperture 16 may include one or more igniters 34 as the size and/or configuration of the engine may allow. When a single aperture 16 includes multiple igniters 34, each of the igniters 34 associated with a particular aperture 16 are preferably conjointly connected, either by a single pair of conductors 32 or by multiple pairs of conductors 32 to a single terminal in the connection block 40. Alternatively, separate pairs of conductors 32 running from a plurality of igniters 34 associated with a single aperture 16 may each be connected to separate terminals in the connection block 40 but are preferably controlled in a coordinated manner by the microprocessor control unit 24 so as to spark almost simultaneously in time with the engine. In addition, a plurality of igniters 34 associated with a single aperture 16 may be programmed to spark in any predetermined order. For example, the plurality of igniters 34 in a single aperture 16 may be programmed to spark sequentially around the perimeter of the aperture 16 so as to create a combustion vortex in the corresponding piston cylinder 18.

Figure 3A:
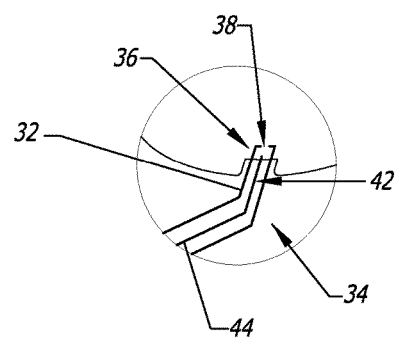

FIG. 3 further illustrates a temperature sensor 42 disposed between the electrodes 36 of each igniter 34. FIG. 3a shows the igniter 34, electrodes 36, gap 38, and sensor 42 in close-up. The temperature sensor 42 is connected by a secondary conductor 44 to the connection block 40. The temperature sensor detects and reports the temperature of combustion in the piston cylinder 18. Upon receiving this information, the microprocessor control unit 24 can be programmed to modulate the combustion temperature by under or over compensating for the plasma spark to each electrode as described further below. There is preferably at least one temperature sensor 42 per aperture 16. Other sensors may also be included such as a pressure sensor to measure the cylinder pressure in a particular piston cylinder 18. The microprocessor control unit 24 is configured to pick up data from all of these environmental sensors. The microprocessor control unit 24 may also have a connection to the tachometer sensor so that it knows the RPMs of the engine.

Figure 4:
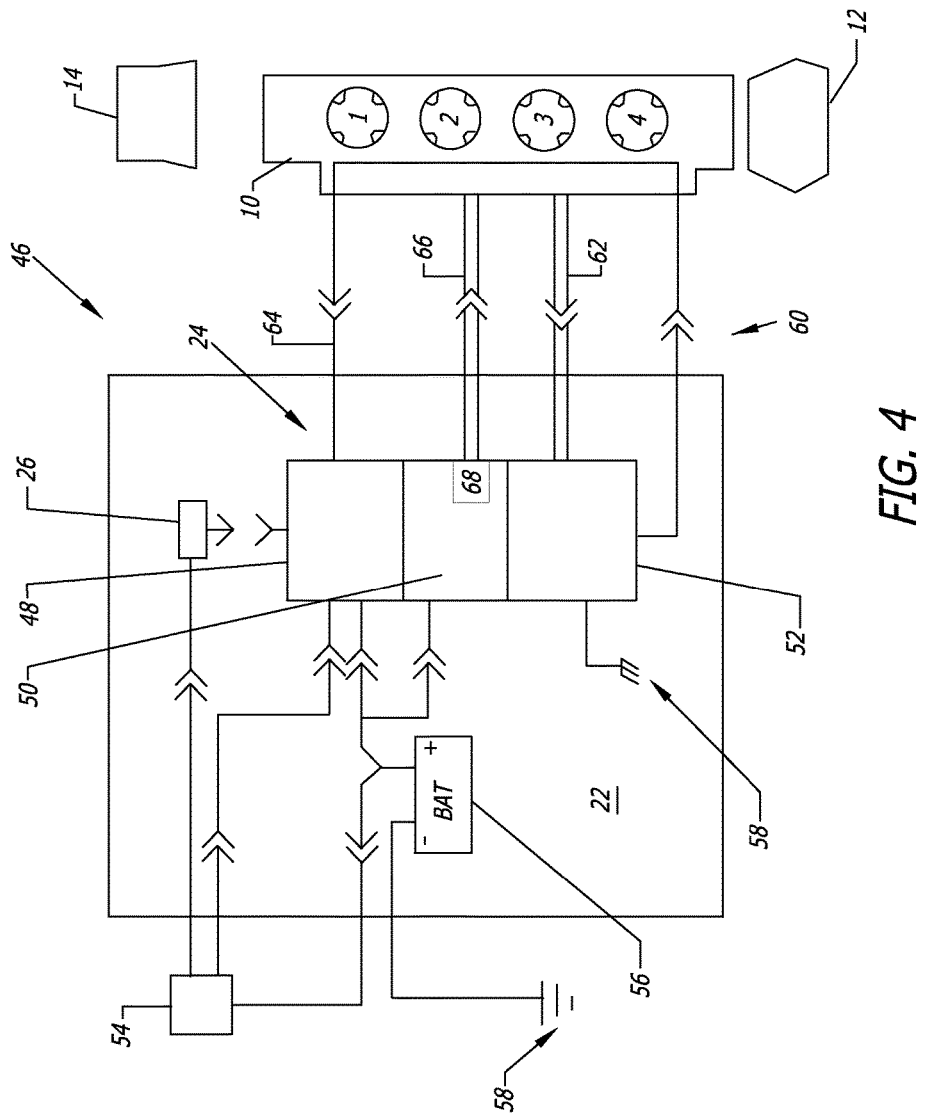
FIG. 4 is a schematic illustration of the inventive plasma header gasket system of the present invention.
Figure 5:
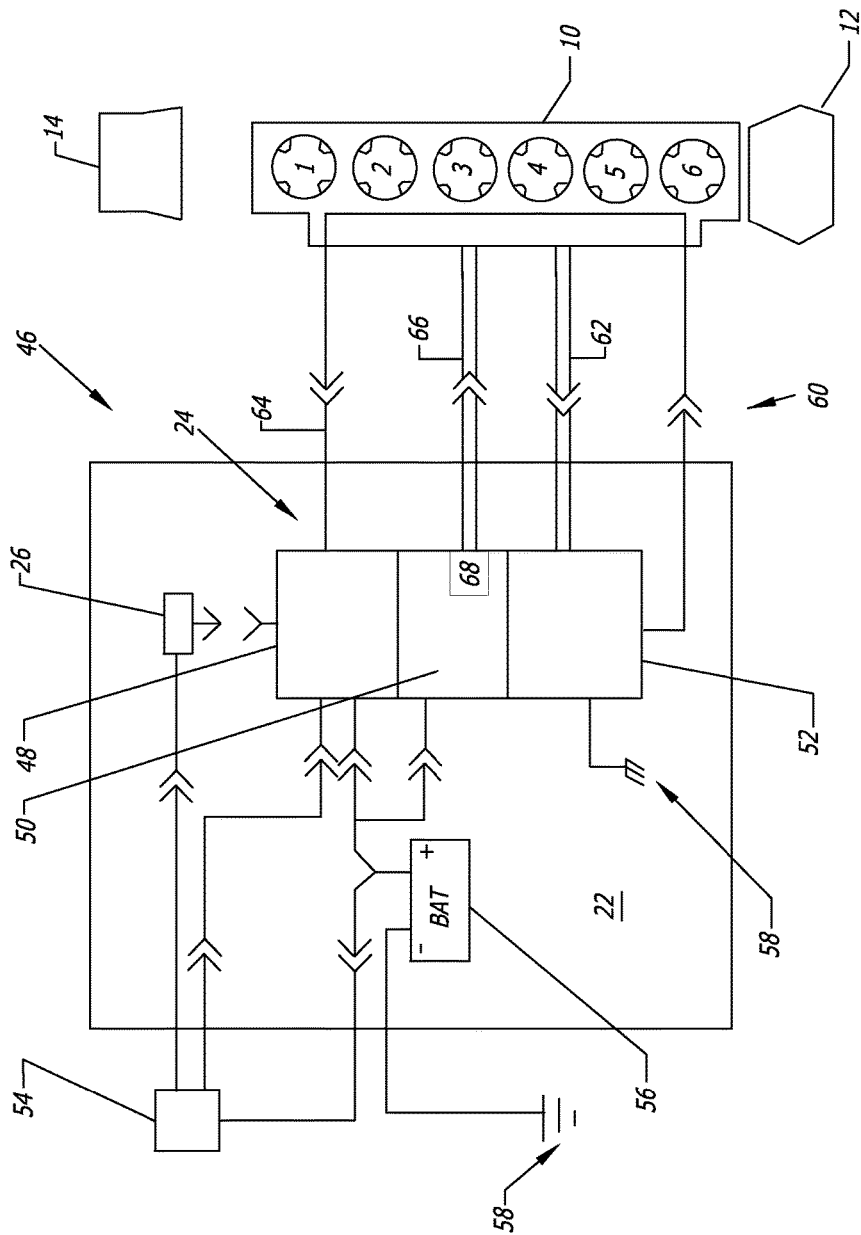
FIG. 5 is a schematic illustration of an alternate embodiment of the inventive plasma header gasket system of the present invention.

FIG. 4 schematically illustrates a system 46 incorporating the inventive plasma header gasket 10 having four cylinder apertures. As illustrated, the system 46 may be designed for an engine having varying numbers of piston cylinders. FIG. 5 alternately illustrates the system 46 with an engine block 12 having six cylinder apertures and corresponding engine headers 14. The plasma header gasket 10 will have a corresponding number of apertures 16 depending on the number of cylinders 18 in the engine block 12. These alternate plasma header gasket 10 embodiments have similar connections to the remainder of the system 46.

The system 46 includes the microprocessor control unit 24 mounted on or near the firewall 22 of the engine compartment. The microprocessor control unit preferably includes a dynamic engine control unit (ECU) module 48, a dynamic ignition (IGN) module 50 and an alternate fuel processor 52. The system 46 may be installed as the ignition system in a new engine, in a retrofit to work in parallel with an existing ignition system, or in a retrofit as a complete replacement of an existing ignition system.

In the case of a retrofit into an existing engine, the microprocessor control unit 24 is wired into the existing ignition system including the OEM ECU 54, the ignition coil 26, the battery 56, and appropriate electrical grounds 58. In such a retrofit system, the dynamic ECU module 48 and dynamic IGN module 50 are programmed to work with the existing OEM ECU 54 and ignition coil 26 so as to spark the igniters 34 on the plasma header gasket 10 in time with the existing ignition source, e.g., spark plugs or compression. The intention of this configuration is to improve upon the efficiency of the combustion occurring in the piston cylinders 18.

The microprocessor control unit 24 receives sensor data from the plasma header gasket 10 through its electrical connections 60 therewith. The electrical connections 60 include a data connection 62 whereby the microprocessor control unit 24 receives temperature, pressure and other parameter data that may be measured by the plasma header gasket 10 and its various sensors. An RPM connection 64 receives data from an existing tachometer sensor in the engine to assist the microprocessor control unit 24 in timing the spark of the igniters 34 with the engine timing. A spark connection 66 provides the electrical conductivity to the connection block 40 which is in turn passed through the pairs of conductors 32 to the igniters 34.

This spark connection 66 passes on a high voltage current from the microprocessor control unit 24. The high voltage current is configured to produce a plasma spark in the electrode gap 38 of the igniters 34. Prior art ignition systems typically produced sparks on the order of fifteen milliamps in the case of a generic ignition system or thirty milliamps in the case of a multiple spark discharge ignition system. The plasma header gasket system 46 of the present invention is configured to produce sparks having a current on the order of two hundred amperes per discharge—over ten thousand times the current of a typical prior art ignition system. The dynamic IGN module 50 includes a plasma power module 68 which includes plasma circuitry designed to step up the current supplied by the ignition system 46 and produce the larger spark resulting in increased combustion efficiency.

As described above, the temperature sensor 42 measures the temperature of combustion in the piston cylinder 18. The sensor 42 transmits the signal via the secondary conductor 44 and the data connection 62 to the microprocessor control unit 24. The microprocessor control unit 24 can adjust the output of the plasma power module 68 to either over or under compensate for the discharge current in the igniters 34 to either increase or decrease the temperature of ignition in the piston cylinder 18.

As previously suggested, the inventive system 46 may be installed on any type of fuel burning internal combustion engine, i.e., gasoline or diesel, or any other engine requiring combustion of fuel. If installed on a gasoline engine, the system 46 can use the existing distributor and ignition coil 26 for the established firing order of the pistons. If installed on a diesel engine, the system 46 simulates the firing order by preprogramming the same into the microprocessor control unit 24. Ignition parameters such as dwell timing can be programmed in to the microprocessor control unit 24. Such programming allows for a simulated firing order without an existing distributor or rotor tied into the system 46.

With the addition of the plasma header gasket system 46, a diesel engine can be configured to burn other types of fuel requiring a spark for combustion versus compression for combustion. The alternate fuel processor 52 can be programmed with the parameters necessary to initiate combustion with these other types of fuels. The plasma header gasket system 46 may also produce a plasma spark having sufficient temperature to more fully combust diesel fuel on top of the combustion initiated by compression. The thickness of the plasma header gasket 10 may be adjusted to modify the compression ratio in various engines. In the case of an engine with existing spark plugs, the plasma header gasket 10 may be installed in parallel with the existing spark plugs or in replacement of the existing spark plugs. The plasma header gasket 10 may also be installed on an existing engine without removing the same from the engine compartment. It may only be necessary to remove and/or replace the engine header 14 during installation of the plasma header gasket 10.

The addition of the igniters 34 on the plasma header gasket 10 introduces additional ignition sources that produce a cleaner burn in the piston cylinder 18. This cleaner burn dramatically reduces harmful emissions resulting from combustion. This improvement is particularly important for two-stroke engines such as lawnmowers, leaf blowers, outboard motors and motorcycles. The cleaner burn also drastically reduces particulates from combustion that are passed through the exhaust system.

Although several embodiments have been described in detail for purposes of illustration, various modifications may be made without departing from the scope and spirit of the invention. Accordingly, the invention is not to be limited, except as by the appended claims.

What is claimed is:

1. A plasma header gasket for a diesel engine, comprising:
   a laminated substrate comprising dielectric layers, the substrate having an aperture, wherein the aperture corresponds to a piston cylinder in an engine block for the diesel engine;
   a plurality of pairs of conductors associated with the substrate, wherein each of the plurality of pairs of conductors comprises electrically conductive circuit traces disposed between the dielectric layers;
   a plurality of plasma igniters, each electrically connected to one of the plurality of pairs of conductors, each of the plurality of plasma igniters comprising a pair of exposed electrodes defining an electrode gap extending from an edge of the aperture into the piston cylinder; and
   a microprocessor control unit electrically connected to the plurality of pairs of conductors, wherein the microprocessor control unit is programmed to spark the plurality of plasma igniters in time with a piston in the piston cylinder and programmed to spark the plurality of plasma igniters sequentially around the edge of the aperture.

2. The plasma header gasket of claim 1, further comprising a connection block disposed on the substrate and electrically connected to the plurality of pairs of conductors.

3. The plasma header gasket of claim 2, wherein the circuit traces electrically connect each of the plurality of plasma igniters to the connection block.

4. The plasma header gasket of claim 2, further comprising a temperature sensor associated with the aperture and electrically connected to the connection block by a secondary conductor associated with the substrate.

5. The plasma header gasket of claim 2, wherein the laminated substrate has a plurality of apertures, each aperture corresponding to one of a plurality of piston cylinders in the engine block.

6. The plasma header gasket of claim 5, wherein each of the plurality of apertures comprises a separate plurality of igniters each electrically connected to one of the plurality of pairs of conductors.

7. A plasma header gasket system for a diesel engine, comprising:
- a laminated substrate having a plurality of apertures, wherein each of the plurality of apertures corresponds to a one of a plurality of piston cylinders in an engine block;
- a plurality of pairs of conductors associated with the substrate;
- a plurality of plasma igniters associated with each of the plurality of apertures, each of the plurality of plasma igniters electrically connected to one of the plurality of pairs of conductors, each of the plurality of plasma igniters comprising a pair of exposed electrodes defining an electrode gap extending from an edge of the aperture into the corresponding one of the plurality of piston cylinders;
- a connection block disposed on the substrate and electrically connected to the plurality of pairs of conductors;
- a microprocessor control unit electrically connected to the connection block, wherein the microprocessor control unit is programmed to spark the plurality of plasma igniters in time with a piston in the corresponding piston cylinder and programmed to spark the plurality of plasma igniters sequentially around the edge of a particular aperture; and
- a plasma amplifier electrically connected to the plurality of plasma igniters and controllable by the microprocessor control unit, wherein the plasma amplifier produces a plasma spark through each of the plurality of plasma igniters when the microprocessor control unit sparks one of the plurality of plasma igniters.

8. The plasma header gasket system of claim 7, wherein the substrate comprises dielectric layers and the plurality of pairs of conductors comprise electrically conductive circuit traces laminated between the dielectric layers.

9. The plasma header gasket system of claim 8, wherein the circuit traces electrically connect the plurality of plasma igniters to the connection block.

10. The plasma header gasket system of claim 7, further comprising a temperature sensor associated with each of the plurality of apertures and electrically connected to the connection block by a secondary conductor associated with the substrate.

* * * * *